US006295464B1

(12) United States Patent
Metaxas

(10) Patent No.: US 6,295,464 B1
(45) Date of Patent: Sep. 25, 2001

(54) APPARATUS AND METHOD FOR DYNAMIC MODELING OF AN OBJECT

(76) Inventor: Dimitri Metaxas, 2020 Walnut St. Apt. 196, Philadelphia, PA (US) 19103

( * ) Notice: Subject to any disclaimer, the term of this patent is extended or adjusted under 35 U.S.C. 154(b) by 0 days.

(21) Appl. No.: 09/142,574

(22) PCT Filed: Jun. 14, 1996

(86) PCT No.: PCT/US96/10413

§ 371 Date: Nov. 3, 1998

§ 102(e) Date: Nov. 3, 1998

(87) PCT Pub. No.: WO97/00498

PCT Pub. Date: Jan. 3, 1997

Related U.S. Application Data

(60) Provisional application No. 60/000,282, filed on Jun. 16, 1995.

(51) Int. Cl.[7] ............................................. A61B 5/00
(52) U.S. Cl. ...................... 600/407; 600/410; 600/416; 600/425; 600/437; 250/363.03; 378/4; 382/131; 703/11
(58) Field of Search ................................. 600/407, 410, 600/425, 437, 416; 378/4; 250/363.02, 363.03; 382/131; 703/11

(56) References Cited

U.S. PATENT DOCUMENTS

| | | | |
|---|---|---|---|
| 5,046,022 | 9/1991 | Conway et al. ..................... 364/513 |
| 5,151,856 | 9/1992 | Halmann et al. ................ 364/413.03 |
| 5,166,875 | 11/1992 | Machida .......................... 364/413.13 |
| 5,222,201 | 6/1993 | Lis .................................... 395/120 |
| 5,247,590 | 9/1993 | Fukuhara et al. ..................... 382/56 |
| 5,261,050 | 11/1993 | Fox et al. ........................... 395/166 |
| 5,273,038 | * 12/1993 | Beavin ................................ 600/427 |
| 5,313,567 | 5/1994 | Civanlar et al. .................... 395/124 |
| 5,345,490 | 9/1994 | Finnigan et al. ........................ 378/4 |
| 5,384,573 | 1/1995 | Turpin .................................. 342/179 |
| 5,427,531 | 6/1995 | Kramer ................................. 434/302 |
| 5,442,733 | 8/1995 | Kaufman et al. .................... 395/124 |
| 5,452,407 | 9/1995 | Crook .................................. 395/121 |
| 5,454,069 | 9/1995 | Knapp et al. ........................ 395/120 |
| 5,454,838 | 10/1995 | Vallana et al. ........................ 607/19 |
| 5,601,084 | * 2/1997 | Sheehan et al. ..................... 600/425 |

OTHER PUBLICATIONS

Arts, T., et al., "Epicardial deformation and left ventricular wall mechanics during ejection in the dog", *Am. J. Physiol.*, 1982, 243, H379–H390.

Arts, T., et al., "Macroscopic Three–Dimensional Motion Patterns of the Left Ventricle", *Adv. Exp. Med. & Biol.*, 1993, 346, Chapter 37, 383–392.

Axel, L. and Dougherty, L., "Heart Wall Motion: Improved Method of Spatial Modulation of Magnetization for MR Imaging", *Cardiac Radiology*, 1989, 172, 349–350.

(List continued on next page.)

*Primary Examiner*—Ruth S. Smith
(74) *Attorney, Agent, or Firm*—Woodcock Washburn Kurtz Mackiewicz & Norris LLP

(57) ABSTRACT

A method and apparatus for dynamic modeling of an object having material points. The method includes receiving signals from a sensor which correspond to respective material points; providing a volumetric model, having functions as parameters, representative of the object; and adapting the parameters to fit a changing model shape. This method of dynamic shape modeling dynamic motion modeling or both includes shape estimation and motion analysis. The apparatus includes a signal processor for receiving signals from a sensor, a second signal processor for providing a volumetric model having functions as parameters representative of the object and a third signal processor for receiving sensed signals and adapting the model and providing a dynamic representation.

32 Claims, 15 Drawing Sheets

☐ — IMAGE PLANE
⋮⋮⋮ — TAGGING PLANE
— — TAGGING LINE (t=1)
- - - — TAGGING LINE (t=2)
○ — MATERIAL POINT (M)
● — SPAMM DATA POINT (S)

OTHER PUBLICATIONS

Axel, L., et al., "Regional Heart Wall Motion: Two–dimensional Analysis and Functional Imaging with MR Imaging", *Cardiac Radiology*, 1992, 183, 745–750.

Conolly, S., et al., "Magnetic Resonance Imaging", Chapter 65, in *Imaging*, CRC Press, Inc., 1995, pp. 1006–1045 and Croft, et al., "Nuclear Medicine", Chapter 66, in *Imaging*, CRC Press., 1995, pp. 1046–1076.

Fischer, S.E., et al., "True Myocardial Motion Tracking", *Magnetic Resonance in Med.*, 1994, 31, 401–413.

Geddes, L.A., "Cardiac Output Measurement", Chapter 74, in *Medical Instruments and Devices*, CRC Press, Inc., 1995, pp. 1212–1222.

Gupta, A., et al., "Segmentation and Tracking of Cine Cardiac MR and CT Images Using a 3–D Deformable Model", *Computers in Cardiol.*, 1994, ISBN 081866570, pp. 661–664.

Huang, W.C. and Goldgof, D.B., "Adaptive–Size Meshes for Rigid and Nonrigid Shape Analysis and Synthesis", *IEEE Trans. on Pattern Analysis*, 1993, 15, 611–616.

Kass, M., et al., "Snakes: Active Contour Models", *Int. J. Computer Vision*, 1988, 1, 321–331.

McCulloch, A.D., "Cardiac Biomechanics", Chapter 31, in *Biomechanics*, 1995, CRC Press, Inc., pp. 418–439.

McInerney, T. and Terzopoulos, D., "A Finite Element Model for 3D Shape Reconstruction and Nonrigid Motion Tracking", Proc. 4th Int. Conf. On Computer Vision, Berlin, Germany, 1993, 518–523.

Moulton, M.J., et al., "Three–dimensional regional ventricular wall strains calculated from magnetic resonance imaging tagging: validation with finite element analysis", *APStracts*, 2:0288H, 1995.

Park, J., et al., "Model–based Analysis of Cardiac Motion from Tagged MRI Data", *Proc. Seventh Annual IEEE Symp. On Computer–Based Med. Systems, Winston–Salem, N.C.*, 1994, 40–45.

Park, J., et al., "Deformable Models with Parameter Functions for Left Ventricle 3–D Wall Motion Analysis with Visualization", *Proc. IEEE Conf. On Computer Vision and Pattern Recognition*, 1994, Cat. No. 94CH3450–8, pp. 241–244.

Prause, G.,et al., "3–D Reconstruction of the Ventricular Dynamic Shape from the Density Profiles of Biplane Angiocardiographic Image Sequences", *Computers in Cardiology*, 1994, ISBN 081866570, pp. 193–196.

Timmons, W.D., "Cardiovascular Models and Control", Chapter 158, in *Physiologic Modeling, Simulation and Control*, CRC Press, Inc., 1995, pp. 2386–2403.

Young, A.A., et al., "Estimation of Epicardial Strain Using the Motions of Coronary Bifurcations in Biplane Cineangiography", *IEEE Trans. on Biomed. Engineering*, 1992, 39, 526–531.

Young, AA and Axel, L., "Three–dimensional Motion and Deformation of the Heart Wall: Estimation with Spatial Modulation of Magnetization—A Model–based Approach", *Radiology*, 1992, 185, 241–247.

Young, A.A., et al., "Validation of Tagging with MR Imaging to Estimate Material Deformation", *Cardiac Radiology*, 1993, 188, 101–108.

Zerhouni, E.A., et al., "Human Heart: Tagging with MR Imaging—A Method for Noninvasive Assessment of Myocardial Motion", *Cardiac Radiology*, 169, 59–63.

\* cited by examiner

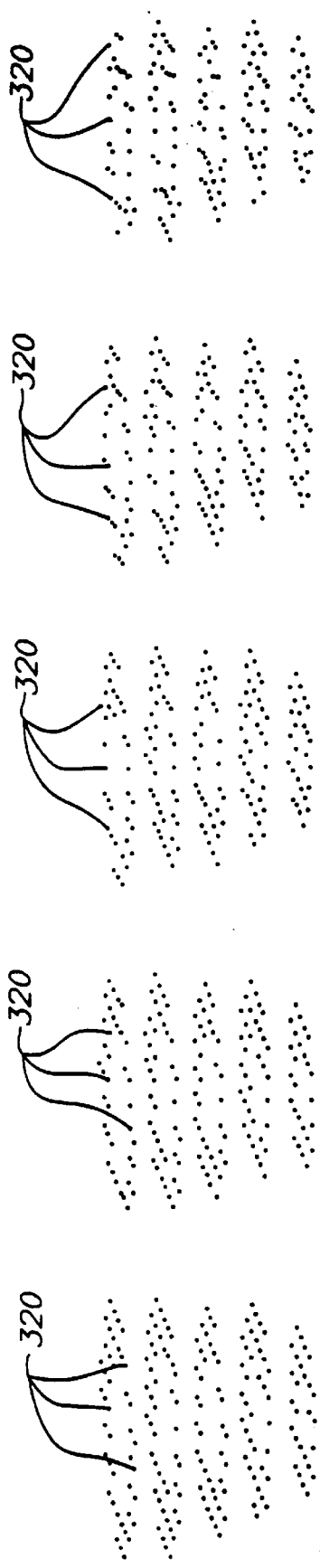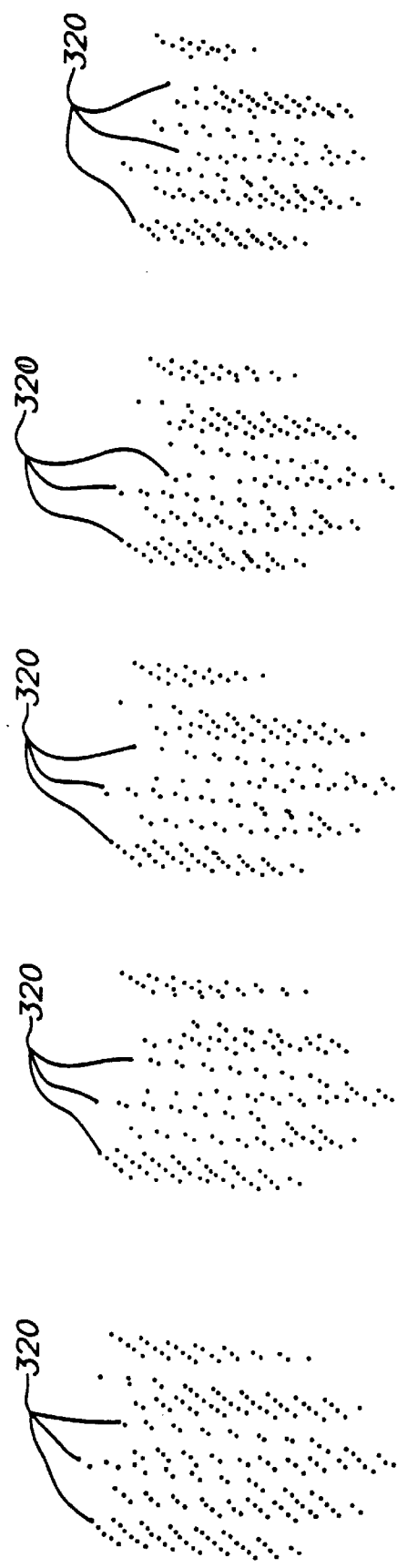
FIG.11a FIG.11b FIG.11c FIG.11d FIG.11e
FIG.11f FIG.11g FIG.11h FIG.11i FIG.11j

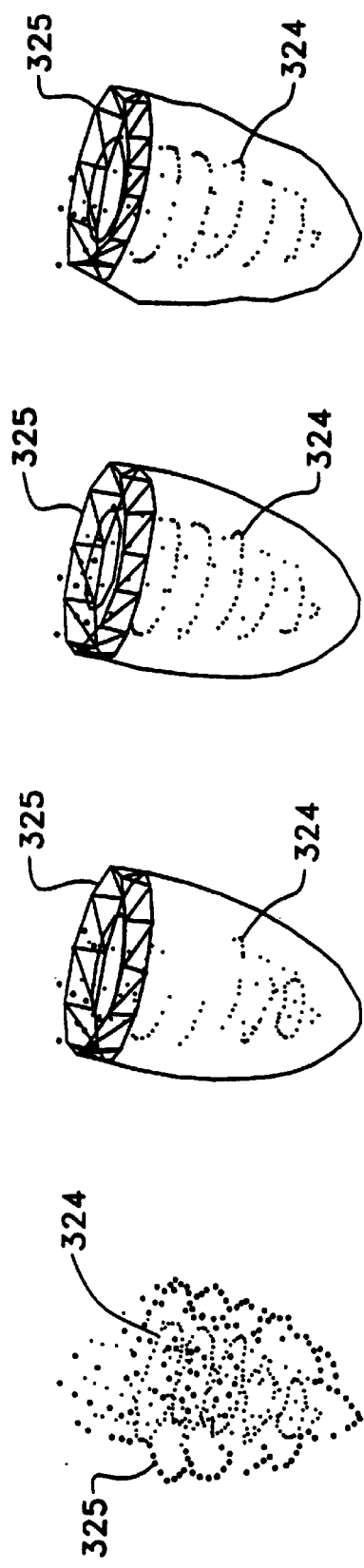

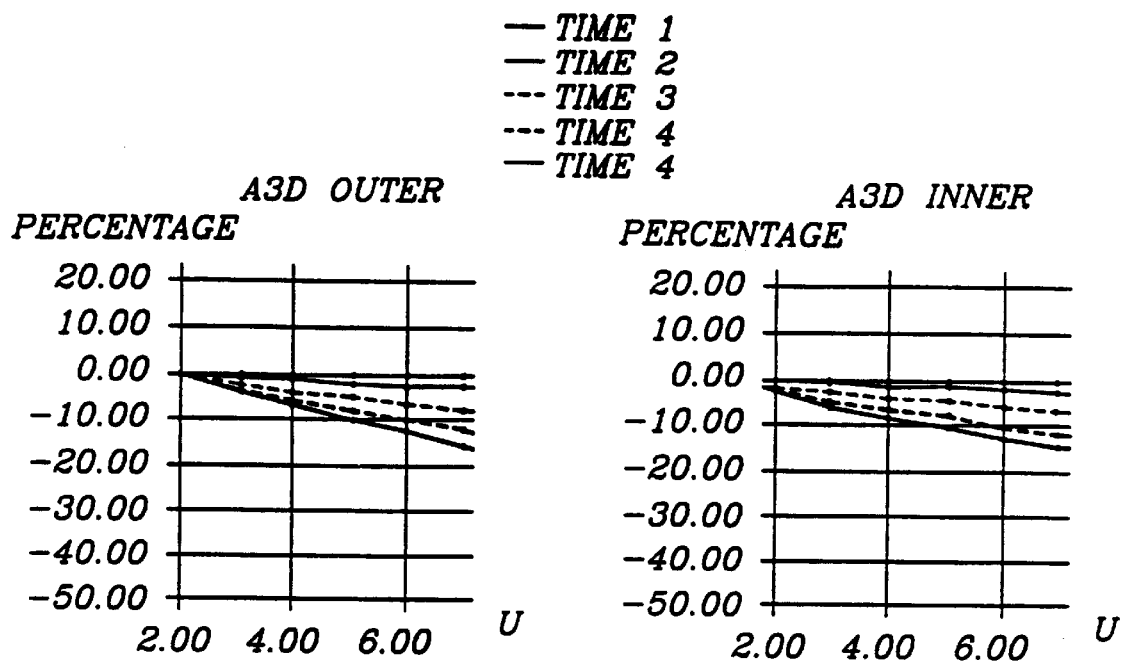
FIG. 13e
FIG. 13f
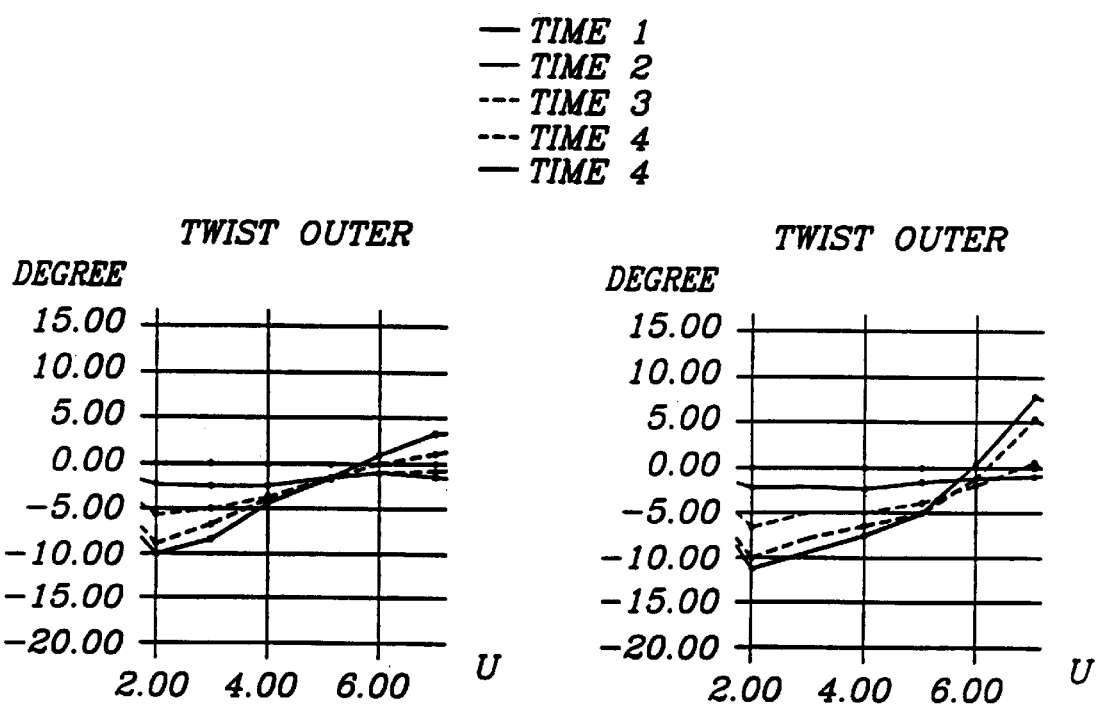
FIG. 13g
FIG. 13h

APPARATUS AND METHOD FOR DYNAMIC MODELING OF AN OBJECT

RELATED APPLICATION

This application claims the benefit of U.S. Provisional Application No. 60/000,282, filed Jun. 16, 1995.

FIELD OF THE INVENTION

The invention relates to an apparatus and method for object modeling, particularly to dynamic modeling of an object, and most particularly to dynamic modeling, shape estimation, and motion analysis of an object having material points therein, for example, a human heart.

BACKGROUND OF THE ART

Many model-based approaches to the analysis of the complicated motion of an object, such as the left ventricle (LV) of the heart, and the quantification of its measured deformation, exist. Simple analytical models like spheres, ellipsoids or cylinders often are used. For example, Beyar and Sideman constructed a mechanical model where the LV is modeled as a nested-shell spheroidal to explain the effect of twisting motion; Arts (1982) used a thick-walled cylinder composed of eight concentric cylinder shells to describe the LV deformation; Kim et al. used a thick-walled ellipsoidal model for the computation of the LV wall stress, and a truncated ellipsoidal model for simulation of regional stress; Azhari et al. used a hollow conical shell (with a constant shear modulus) to characterize transmural twist motion; and Arts (1992, 1993) developed a kinematic model by combining the deformation modes from a spherical, a prolate ellipsoidal and a cylindrical model. However, the shape of the L is neither spherical nor cylindrical. Even a prolate ellipsoid, is a gross simplification of the shape of an LV. Therefore, the analyses made by these models make simplifying assumptions about the material behavior of the heart muscle and the governing equations of motion.

Recently, techniques based on the use of deformable models for reconstructing the 3D surface shape and motion of the L from CT or MRI data have been developed. The techniques use finite elements, spring-mass systems, deformation modes, bending and stretching thin-plate models, and other physics-based or geometric techniques to fashion the desirable model. The main limitation of most techniques is that they do not provide intuitive motion parameters to model the rigid and non-rigid motion of the LV. Most of the techniques represent the L motion as a set of local displacement vectors which either requires non-trivial post-processing to be useful to a physician or it is only good for qualitative visualization.

On the other hand, some models tend to be formulated in terms of very few parameters that can offer only a gross approximation to the motion of the LV. Attempts to characterize the L motion based on deformation modes, also do not provide a suitable localization of the L deformations and motion in a clinically useful manner without complex post-processing, due to the global definition of each modal deformation. Moreover, most techniques ignore the twisting or wringing motion of the LV known to occur during systole. A class of surface-deformable primitives whose global parameters are functions were developed to overcome the existing model limitations. The utility of this class, however, is usually limited to representing LV surface shape and motion because the L motion cannot be captured entirely with surface models.

To capture the LV shape and motion throughout its volume, a volumetric deformable model is desirable. Recently, techniques for analyzing the L volumetric shape and motion from tagged MR image sequences have also been developed based on the use of 3D finite elements. Such model-based approaches to the recovery of the volumetric shape and motion of the LV can be useful in overcoming the limitation of current medical imaging modalities. Such modalities typically cannot provide explicit, time-varying 3D motion of material data points from to the LV. The translation of the deforming heart through the fixed image planes puts a different cross section of myocardium into the image plane at each time point. Therefore the imaging techniques can provide only the two-dimensional motion of the object's material points on the imaging plane at best.

Finite element modeling is a typical choice for volumetric motion analysis, because it provides strain analysis throughout the LV wall. However, the finite element representation does not directly lend itself to an understanding of the underlying kinematics in a clinically useful way. The parameters of a finite element model are nodal displacements which can result in a relatively large number of parameters. The physical interpretation of these parameters can be difficult. For example, the 3D strain tensor has three normal components and three shear components, each of which may vary with position in the LV wall. In order to understand the complex relationship between these components and other motion parameters, it is desirable to characterize the motion in terms of meaningful physical parameters-that offer sufficient accuracy.

Characterization of heart wall motion on a regional level is desired to understand cardiac mechanics and the processes underlying a disease. In order to accurately measure heart wall motion, a number of material points in the heart must be located and tracked. Methods for providing intra-myocardial markers in the past have included the implantation of radiopaque markers, lead beads or ultrasonic crystals, use of naturally occurring landmarks, and magnetic resonance (MR) tagging.

Although the implantation methods have been used for the LV motion analysis, and provide accurate localization, the invasive nature of the procedures does not allow a sufficient number of markers to be implanted for describing the LV geometry. Moreover, it poses the potential problem of local myocardium property alteration due to the introduction of foreign objects. On the other hand, the methods which utilize naturally occurring landmarks, like bifurcations of coronary arteries, do not require a surgery and can provide potentially many markers. However, intra-coronary injection of contrast medium is usually required to highlight the blood vessels in acquired images. When the blood supply is severely obstructed due to arterial occlusion, the tracing of the feature points around the region can be very difficult to achieve.

MR tagging has its advantages over the aforementioned approaches because a large number of material points may be marked and tracked during systole in a non-invasive manner. By locally perturbing the magnetization in tissue, one can create spatially encoded patterns such as starbursts or grids. Those patterns or magnetization tags are seen as dark regions in subsequent images (within a certain relaxation time $T_1$). As magnetization moves with tissue, the magnetization tags will move in the corresponding images, directly reflecting the motion of the underlying tissue and allowing us to follow the motion patterns within otherwise featureless structures such as the heart wall. One drawback of current MR tagging techniques, is that the tracking is possible only during systole or diastole at one time (i.e., not for a complete heart cycle), due to the decay of the magnetization signal over time.

Recently, curvature-based point correspondence recovery techniques have been proposed by researchers as an alternative to the above methods. One method employs the computation of the Gaussian curvature of a model that deforms based on the assumption of conformal motion. Another method utilizes the potential energy of their bending and stretching model to estimate the curvature. A third method combines curvature extraction with Phase Velocity MRI, in an attempt to assess the transmural myocardial deformation in 2D. A fourth method demonstrates the stability of the Gaussian curvature computation in an experiment where the Gaussian curvature was computed through an iterative relaxation scheme from voxel-based surface rendering of CT left-ventricle volumetric data over a cardiac cycle. The derivation of point-correspondences based on curvature may be applied to data sets from many different medical imaging modalities, and it may provide point-correspondence over an entire heart cycle.

What is needed is an apparatus and method for dynamic modeling, shape estimation, and motion analysis of an object having material points therein. Such an invention can be particularly useful in the dynamic modeling of, for example, the human heart and can provide a visually perceptible representation of the object which can be intuitively understood by an observer of the display, such as a clinician, and can provide quantitative data regarding the object, for example, the nature and extent of a myocardial defect.

SUMMARY OF THE INVENTION

The invention herein provides a method and apparatus for dynamic modeling of an object having material points therein. The method can include the steps of receiving a first plurality of signals from a sensor which correspond to the respective material points; providing a volumetric model representative of the object, the model having a plurality of parameters, selected ones being functions; and adapting the parameters from a first model shape to a second model shape responsive to the first plurality of signals, the first model shape corresponding with the first object shape and the second model shape corresponding with the second object shape. The step of adapting produces dynamic shape modeling, dynamic motion modeling, or both, from which intuitive and quantitative representation of the object can be obtained, including shape estimation and motion analysis.

By comparing the second set of signals relative to the first set of signals, a perceptive representation of a to defect in the object can be produced. The object can be a human heart, particularly the left ventricle, or also can be any three-dimensional object having observable material points therein, for example, a brain or abdominal structure, or a man-made object. The method also can include the step of producing a visually perceptible representation of the model. The signals received from the sensor can be multiple sets of signals with a subsequent set being generally in temporal correspondence with a prior set.

The sensor can be a magnetic resonance imaging sensor, and the material points can be spatially discernable using a three-dimensional magnetic tagging technique. Also, the sensor can be an ultrasonographic sensor and the material points can be spatially discernable using an ultrasound mapping technique. In addition, the sensor can be a positron emission tomography (PET) sensor, an x-ray computed tomography (CT) sensor, a single-photon emission computed tomography sensor (SPECT), a radar sensor, an electronic signal sensor, and an ionizing radiation sensor.

Where the object is the left ventricle of the heart, the parameters modeled can be representative of radial contraction, longitudinal contraction, axial twisting, or long-axis deformation, or a combination thereof. The step of adapting can includes the step of determining force values representative of adapting the first object shape to the second object shape. The force values can be representative of object rotation or object deformation.

Producing a visually perceptible representation can include providing a parameter graph representative of a selected one of the plurality of parameters; a three-dimensional representation of at least one of dynamic shape modeling and dynamic motion modeling; and a color-based mapping of the parameters onto the model. The step of predicting the second model shape from the first model shape can be included in the step of adapting.

Although the preselected orientation between data sets is preferred to be an orthogonal orientation, a concentric-coplanar orientation, and an angular orientation having a predetermined angle of orientation between the first set and the second set also may be employed. Furthermore, it is preferred that the model be discretized using prismatic volume elements.

Selected ones of the plurality of parameters correspond with respective boundary data points and the step of determining the force values includes determining boundary data point force values representative of a shape of the object. In addition the step of adapting may include the step of tracking spatial projections of selected object material points on an image plane while the object is in motion.

The invention also provides an apparatus for dynamic modeling of an object having material points therein, having a first signal processor for receiving a first plurality of signals from a sensor, with the signals corresponding to respective material points; a second signal processor for providing a volumetric model having multiple function parameters which correspond to at least a portion of a shape of the model; and a third signal processor for receiving the first plurality of signals and for adapting the model thereto, and providing a dynamic representation thereof, which can be a visually perceptible representation of the model.

The visually perceptible representation can be a parameter graph representative of a selected parameter; a three-dimensional representation of dynamic shape modeling, dynamic motion modeling, or both; and a color-based mapping of the parameters onto the model.

The sensor can be a magnetic resonance imaging sensor, and the material points can be spatially discernable using a three-dimensional magnetic tagging technique. Also, the sensor can be an ultrasonographic sensor and the material points can be spatially discernable using an ultrasound mapping technique. Furthermore, the sensor can be a positron emission tomography sensor, an x-ray computed tomography sensor, a single-photon emission computed tomography sensor, a radar sensor, and electronic signal sensor, and an ionizing radiation sensor.

DESCRIPTION OF THE DRAWINGS

FIG. 8b is a long-axis view of the model in FIG. 8a.

FIG. 8c is a short-axis view of the model in FIG. 8a.

FIGS. 11a–j depicts sensed tagged magnetic-resonance data points of a left-ventricular model in motion, with FIGS. 11a–e illustrating a long-axis image view and FIGS. 11f–j illustrating short-axis image views.

FIGS. 12a–d illustrate the fitting of a model to sensed data points.

FIGS. 13a–h depict graphical representations of object parameters as derived from fitting a model to sensed data points.

DESCRIPTION OF THE EMBODIMENTS

Figures 1A, 1B, 1C, 1D, 1E:
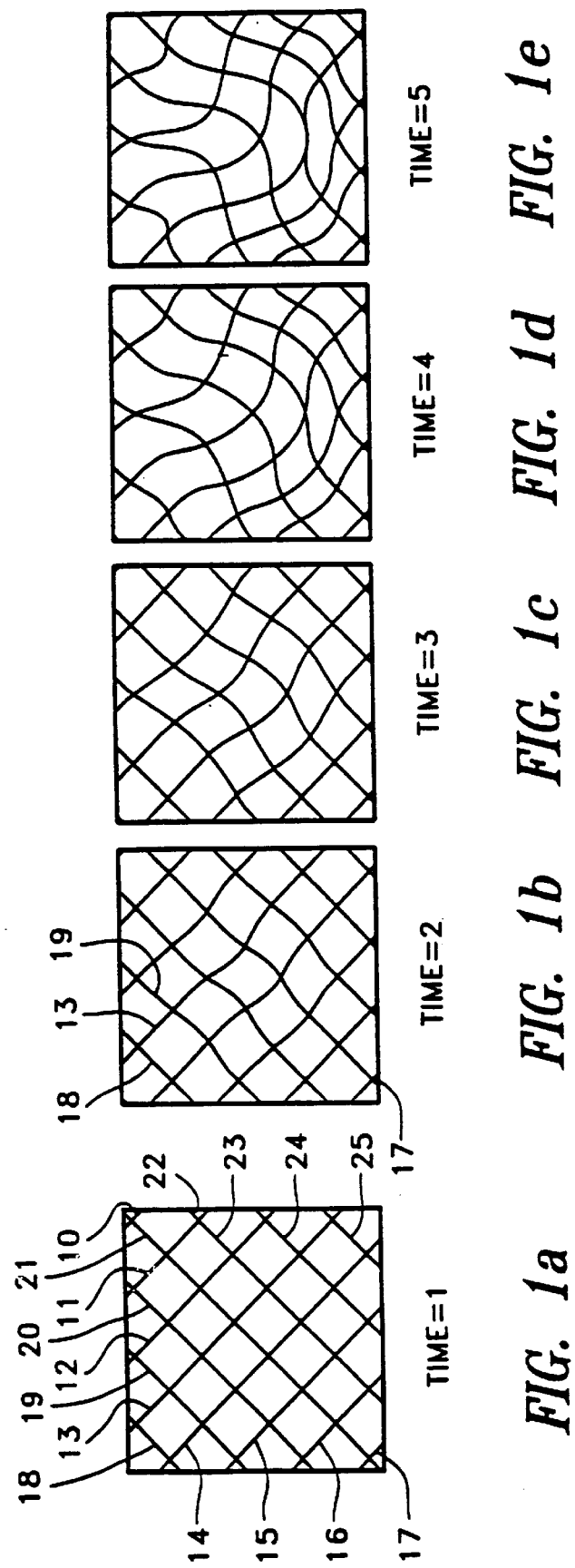
FIGS. 1a–1e are illustration of two orthogonal sets of sensed data points relative to an object in motion, according to the invention herein.

Accurately estimating the volumetric shape, motion and deformations of a deformable object, e.g., the left ventricle (LV), and presenting the estimating of these properties in a readily understandable manner is generally unavailable with existing imaging techniques. For example conventional cardiac imaging methods including MRI still have many limitations, such as a lack of explicit data correspondence between temporal image data frames, and insufficient resolution of the extracted data. In addition, most of the existing models for the analysis of the certain LV shape and motion are based on the use of parameters that are either too complex or too few to be used by a clinician.

A magnetic resonance imaging (MRI) technique based on magnetic tagging employing spatial modulation of magnetization (MRI-SPAMM) has been developed for imaging of an object's regional movement, e.g. heart wall motion. This fast, non-invasive technique can be useful in the analysis of heart wall motion because it can provide temporal correspondence of material points within the heart wall. This correspondence, in conjunction with the use of the three-dimensional (3D) location of each tagged datum, can subsequently input to a motion analysis technique to extract the left ventricle's three-dimensional motion parameters. The motion parameters can then be statistically analyzed to explore their correlation with the various types of left ventricular disease.

Currently, there is still no generally accepted method for analysis and display of the 3-D heart motion. For example, Young (1992) describes a finite-element-based method for reconstructing the 3D motion and deformation of the LV from MRI-SPAMM data. Although the method can provide a good local strain analysis, the model results in a large number of model parameters which typically require non-trivial post-processing to provide meaningful geometric information on the nature of the deformation.

In an effort to overcome the limited clinical usefulness of most existing models for analyzing the LV, a class of deformable 3D surface models were developed whose deformations can be described with a small number of intuitive parameters that are functions. These parameter functions comprise an intelligent grouping into a small number of sets of the many local parameters that may be necessary to analyze the LV's mid-wall. An example of a parameter function is longitudinal contraction, which is the set of parameters describing the contraction of the LV from the apex to the base. Based on this model, the LV shape and motion can be analyzed both locally and globally in a way that is readily understood by a physician.

It is desirable to use a new class of volumetric deformable models that can analyze, in a clinically useful way, the volumetric motion of the LV. The force calculation related to LV motion algorithm is based on the constrained physical motion of SPAMM data points in three dimensions. Force values derived from SPAMM data points originating at two sets of orthogonal planes are preferred to be combined, because only the in-plane motion of a SPAMM data point from a given set of planes can be estimated. In addition to forces from the SPAMM data points, forces from data points originating at the inner and outer walls of the LV can be used to estimate its boundaries. The combination of forces from boundary and SPAMM data points allows the extraction of the volumetric shape and motion of the LV. Also, a new set of visualization tools which include parameter graphs, a 3D representation of the LV's shape and motion, and the color-based mapping of the model's parameters onto the 3D volumetric model. These tools allow the quantitative analysis ot the LV's shape and motion, and the visual representation of the analysis results in a clinically useful manner.

Although the shape and motion estimation technique according to the present invention can be used with any type of LV data, it is preferred to apply the technique to data from an MR tagging method, such as, e.g., MRI-SPAMM. The advantage of the SPAMM technique over the other data extraction techniques is that a number of material points can be marked in a very short time with a simple procedure. Also, these material points can be tracked during systole in a non-invasive setting which provides temporal correspondence of the material points.

Although certain embodiments of the present invention are described in terms of the left ventricle of the heart, any three-dimensional object susceptible to having material points therein being observed by a sensor and related to sensor-generated data points, can be used for dynamic object modeling, shape estimation, and motion analysis, including natural, man-made, and computer-generated objects. Similarly, although certain embodiments are described in terms of tagged magnetic resonance data points sensed by a magnetic resonance imaging sensor, other types of sensors also may be used including, for example, an ultrasonographic sensor, a positron emission tomography sensor, an x-ray computed tomography sensor, a single-photon emission computed tomography sensor, a radar sensor, an electronic signal sensor, and an ionizing radiation sensor.

FIGS. 1(a–e) illustrate short-axis views of an LV from end-diastole (time (t)=1) through contraction periods (t=2, 3,4) to end-systole (t=5), where the SPAMM data points are defined by the intersections of the respective dark lines, 10–25. The SPAMM data collection technique is based on the application of a saturation pulse sequence where the amplitude of the magnetization varies spatially, in a sinusoidal-like fashion prior to imaging. This saturation pulse sequence forms the tagging planes. At the minima of the sinusoidal-like variation of the magnetization, a first set of dark lines 10–17 appear in the image plane which intersects the tagging planes. If tissue imaging is continued after the saturation pulse sequence is applied, those dark lines can be seen to move, thereby allowing the tracking of the underlying tissue motion. To track points instead of lines, another set of saturation pulse sequences can be applied to form a set of tagging planes that are preferably substantially orthogonal to the previous set of tagging planes. As a result, a second set of dark lines 18–25 intersect lines forming an image plane grid.

A skilled artisan would realize that preselected orientations other than orthogonality can be used with the temporal presentation of tagging planes, with suitable plane mapping and transformations. Such orientations can include a concentric-coplanar set orientation, as well as orientations in which the sets are arranged with a preselected angle therebetween.

Where an image plane is substantially spatially fixed, the through-plane motion cannot be captured by the material data points on the image plane, during the imaging of a moving heart.

Figure 2:
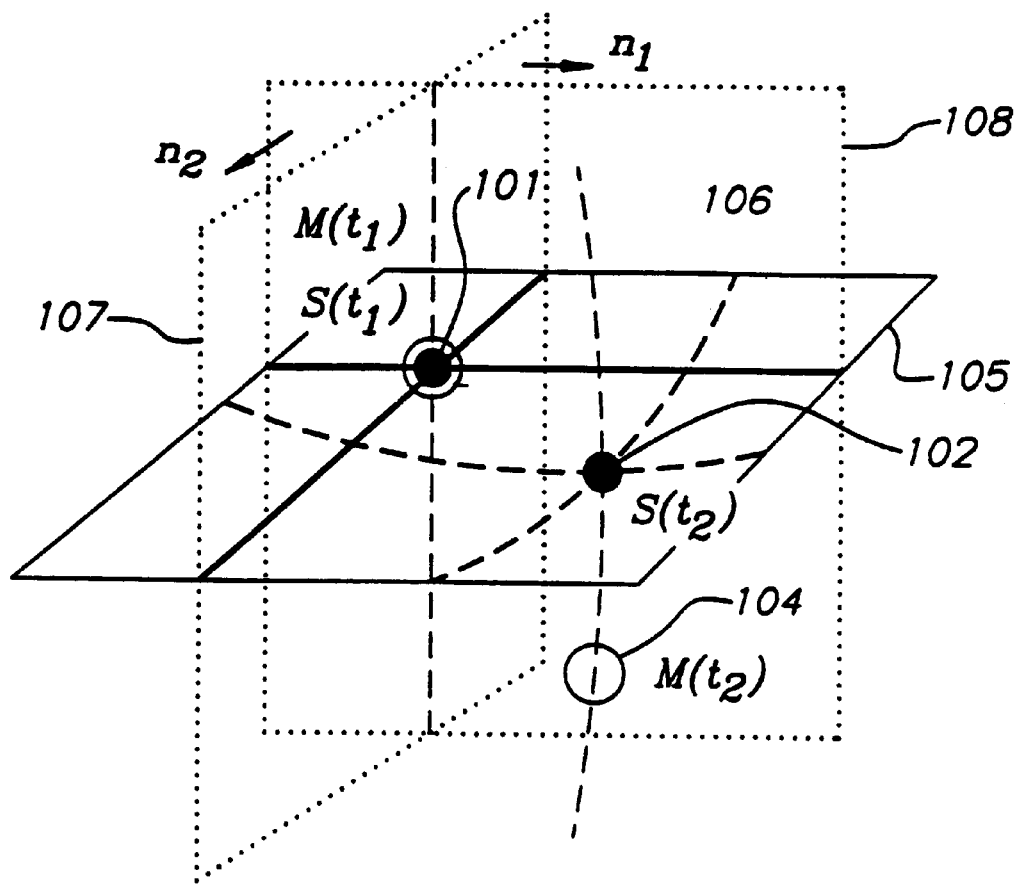
FIG. 2 is an illustration of a technique for tracking sensed data points as they relate to the material points in an object.

FIG. 2 shows the location of a SPAMM data point S at two different times $t_1$, and $t_2$, i.e., $S(t_1)$ 101 and $S(t_2)$ 102. Initially, $S(t_1)$ 101 coincides with a material point $M(t_1)$ 103. However, the motion of the SPAMM data points 101, 102 between these two time instances corresponds to the components on the image plane 105 of the motion of the material point M. Point $M(t_2)$ 104 lies somewhere along the line 106 where the-tagging planes 107, 108 intersect at time $t_2$. Therefore, only the in-plane motion from SPAMM data points 101, 102 can be acquired over time. To determine the 3D motion of material points of the LV from the set of such 2D time-varying data, it is preferred to combine two sets of data obtained from mutually orthogonal image planes. Each material data point is defined to be the intersection of two tagging planes.

Figure 3:
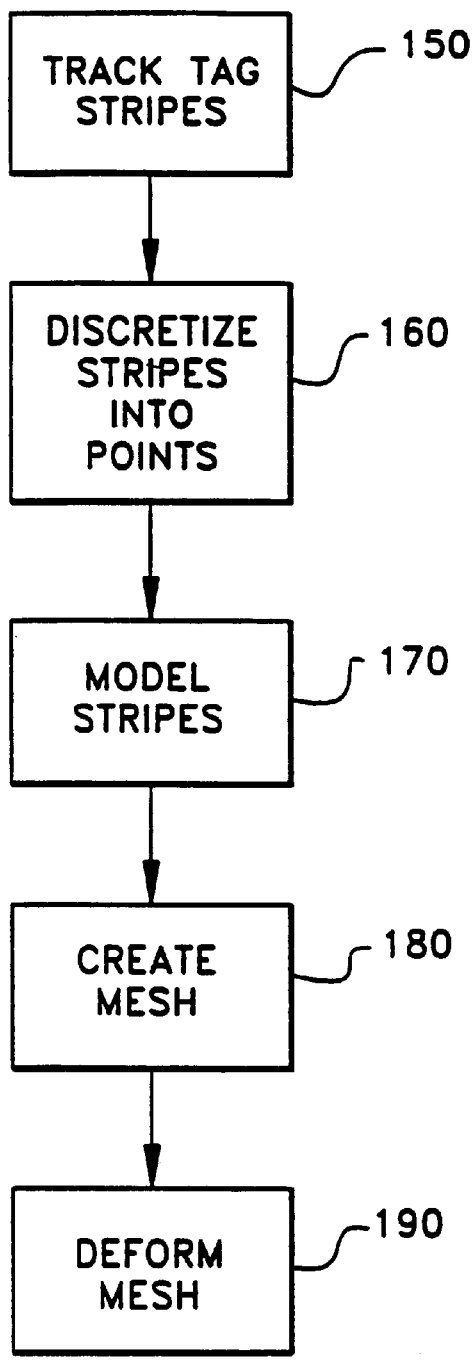
FIG. 3 is a flow diagram for one embodiment of the method according to the invention herein.

One method for extracting the intersection points of tagged lines is illustrated in FIG. 3. First, for each image sequence, the tag stripes within the heart muscle can be tracked semi-automatically using a 2D active-contour model (step 150). Next, it is preferred that each stripe be discretized into equally-spaced points (step 160) and be modeled as a thin, flexible beam with a small inherent resistance to stretching and bending (step 170). Stripes typically are connected at the intersection points (step 180), and the entire mesh can be deformed to track the corresponding intensity values in the image (step 190).

Bilinear interpolation of image intensity between pixels can enable subpixel resolution in stripe tracking, step 150. It is preferred that only those points between the inner and outer boundaries typically be influenced by the image. It also is preferred that the remaining inactive points of the grid be maintained to provide a weak continuity for the structure and to allow points to move onto, or off of, the image plane. During the material data point acquisition process, the spatial location of each image plane can-be evaluated based on the acquired spatial locations of the corners of each image plane and the coordinates of each data point with respect to the centroid of the LV can be expressed.

SPAMM data points in the two orthogonal sets of image planes are not required to correspond to the same material points, but may be different material points. These data can be used in the calculation of the representative forces exerted from the SPAMM data to the volumetric deformable model. In addition to the SPAMM data points, boundary data points from the inner and outer LV also can be extracted using, for example, active contour models and manual initialization.

The method and apparatus using deformable volumetric models according to the present invention allow the use of global parameters that can characterize a volumetric shape in terms of a small number of parameters that are functions. Because these parameters are functions, and not scalars, the localization and detailed estimation of the LV shape and motion can be provided.

One technique for creating an image primitive with parameter functions to model the LV includes initially replacing the constant parameters of a superellipsoid primitive with differentiable parameter functions (e.g., axial deformation). Additional global deformations (e.g., axial twisting) with continuous parameter functions can be added to better capture the LV deformation. It is preferred that those parameter functions are piecewise-linear, so that any shape continuity constraints on the LV shape are not imposed. In other words, the model can deform based on the motion indicated by the SPAMM data, and not on the imposition of constraints such as artificial elastic properties.

To create a volumetric model for the LV with material coordinates u=(u,v,w), it is preferred to first define an inertial frame of reference $\Phi$. Also, it is preferred that the positions on the model be expressed by a vector-valued, time-varying function $x(u,t)=(x(u,t), y(u,t), z(u,t))^T$, where $^T$ denotes transposition. A non-inertial, model-centered reference frame $\phi$ also can be established. The position of a point on the model can be expressed as $$x = c + Rs, \qquad (1)$$

where the center of the model, c(t), is the origin of $\phi$, and the rotation matrix, R(t), gives the orientation of $\phi$, relative to $\Phi$, with a reference shape s. Thus, s(u,t) gives the positions of points on the model relative to the model frame. To model the shape of the LV through s, a generalized volumetric primitive e can be defined as:

$$e = a_0 w \begin{pmatrix} a_1(u) \cos u \cos v \\ a_2(u) \cos u \sin v \\ a_3(u) \sin u \end{pmatrix}, \qquad (2)$$

where $-\pi/2 \leq u \leq \pi/4$, $-\pi \leq v < \pi$, w>0, $a_0$>0, and $0 \leq a_1(u)$, $a_2(u)$, $a_3(u) \leq 1$. $a_0$ is a scale parameter, and $a_1$, $a_2$, and $a_3$ are the aspect ratio parameter functions along the x-, y-, and z-axis, respectively.

Given the above defined primitive $e=(e_1, e_2, e_3)^T$, where $^T$ denotes transposition, parameterized twisting-along the z-axis, and offset deformations, which allow the axis to be non-straight in the x and y directions, both may be defined. The resulting global shape s can then be expressed as:

$$S = \begin{pmatrix} e_1 \cos(\tau(u)) - e_2 \sin(\tau(u)) + e_{1_o}(u) \\ e_1 \sin(\tau(u)) + e_2 \cos(\tau(u)) + e_{2_o}(u) \\ e_3 \end{pmatrix}, \qquad (3)$$

where $\tau(u)$ is the twisting parameter function along the z-axis, and $e_{1_o}(u)$ and $e_{2_o}(u)$ are axis-offset parameter functions in the x and y directions, respectively. The deformation parameter vector $q_s$ can be defined as $$q_s = (a_1(u), a_2(u), a_3(u), \tau(u), e_{1_0}(u), e_{2_0}(u))^T. \quad (4)$$

The parameters, q, of the model that is desired to be recovered are:
where $q_c = c$, is the global translation and $q_\theta$, is the quaternion that corresponds to the global rotation matrix R.

$$q = (q_c^T, q_\theta^T, q_s^T)^T, \quad (5)$$

By incorporating the geometric definition of the models into the present dynamic shape and motion framework, dynamic models can be created that deform due to forces exerted from the data points, and effectively conform to the given data set. In one presently preferred dynamic formulation, a model having essentially no inertia is created that tends to come to rest as soon as all the applied forces substantially equilibrate or vanish. Where the localization and tracking of SPAMM data points is relatively accurate, and to avoid undesired smoothness in the solution caused by the incorporation of incorrect elasticity in the model, a zero stiffness matrix can be used so that there is minimal resistance to deformation. The resulting equation of motion is $$D\dot{q} = f_q, \quad (6)$$

where q is the vector of the model's degrees of freedom, D is the damping matrix used as a stabilizing factor, and $f_q$ are the generalized forces. These forces are associated with the components of q and computed from the 3D force distribution, f, applied to the model based on $$f_q = \int L^T f, \quad (7)$$

where L is the Jacobian matrix. For a fast interactive response, a first-order Euler method can be employed to integrate equation (6). In computing the forces from the data, the algorithm can exploit the geometry of the motion of the SPAMM data points over time. Once these forces are computed, a Lagrangian dynamics formulation can be used to estimate the model parameters.

Figure 4:
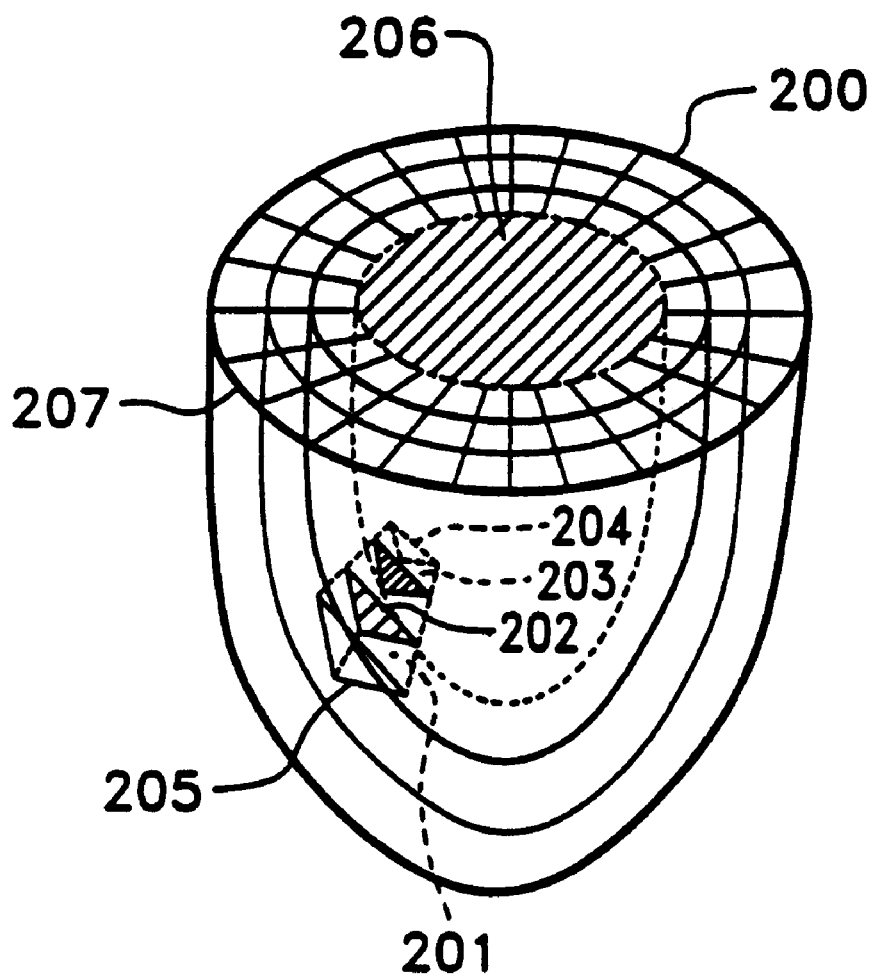
FIG. 4 is a perspective view of a heart model, indicating volume elements.

Next, the model 200 can be discretized based on prismatic volume elements 201–203 as shown in FIG. 4. The resolution of discretization of the volume of the myocardium depends on how dense the SPAMM data points are distributed throughout the volume. Where rather sparse SPAMM data points across the myocardium exist, and the model can be tessellated so that each volume element 201–203 has its triangular faces 204,205 at the LV's inner and outer walls 206,207 respectively.

Figure 5:
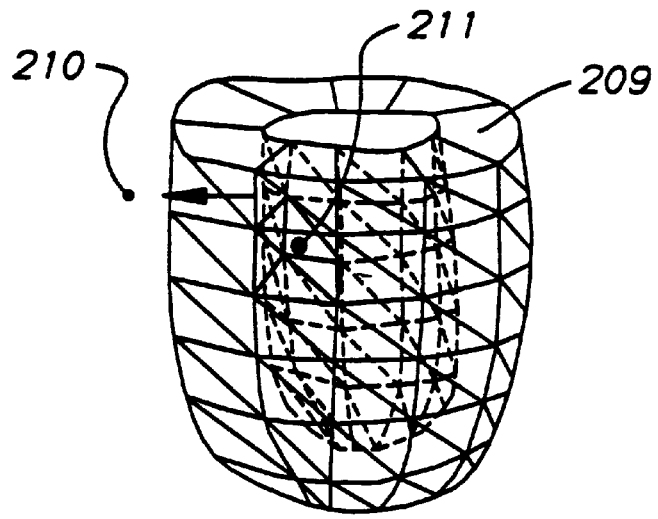
FIG. 5 is a illustration of a left ventricular model having boundary data points and material data points.

Two types of data points may be used with model 209 to estimate the LV shape and motion, as depicted in FIG. 5. One type of data point is boundary data point P, 210, the other type is SPAMM data point M, 211. From these data, the corresponding forces on the model 209 can be computed, depending on their type. Boundary data can provide forces for the estimation of the LV's boundaries, while SPAMM data points provide force data for the estimation of the LV's volumetric shape and motion.

Figure 6:
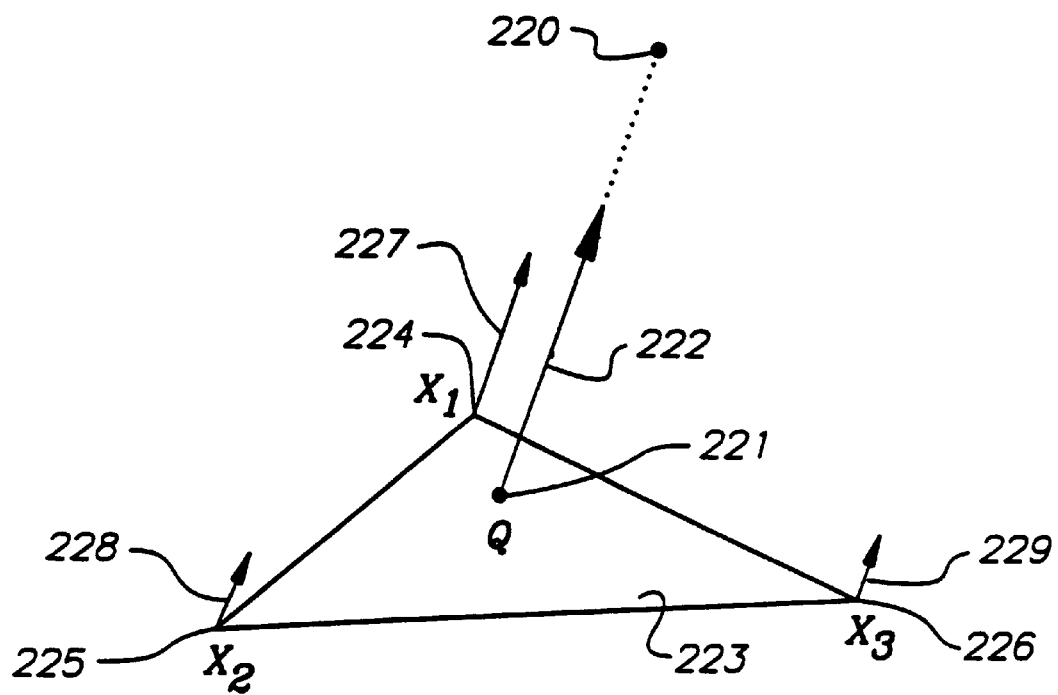
FIG. 6 is a graphical depiction of a force diagram from one element of a model according to the present invention.

In general, boundary data points can constrain the shape of the inner and outer walls of the LV, and typically provide no substantial correspondence of points over time. Therefore, as illustrated in FIG. 6, the forces from each boundary data point P, 220, to the corresponding model wall (inner or outer) can be computed by (1) approximating each boundary triangular element with a plane 223; (2) determining the element 223 whose distance from P, 220, is minimum; and (3) compute the intersection point Q, 221. The force $f_P$, 222, that P, 220, exerts on the model is $$f_{P} = \gamma_1(P - Q), \quad (8)$$

where $\gamma_1$ is the strength of the force. Then $f_P$, 222, can be distributed to the nodes $x_1$, 224, $x_2$, 225, and $x_3$, 226, of the associated boundary triangular element 223 based on the formula $$f_{x_i} = m_i f_P \quad (9)$$

where
 i=1,2,3,
Accordingly, the force 227 at node x, 224, is $m_1 f_P$; at node $x_2$, 225, the force 228 is $m_2 f_P$; and at node $x_3$, 226, the force 229 is $m_3 f_P$.

The $m_i$ are computed from the solution of the following linear system:
subject to the constraint $$\sum_i m_i x_i = Q, \quad (10)$$

$$\sum_i m_i = 1.0, \quad (11)$$

This constraint is preferred in this embodiment to create the equality $$\sum_i f_{x_i} = \sum_i m_i f_P = f_P \quad (12)$$

Intuitively, each $m_i$ is a weight given to each element node, 224–226, and the vector Q 221 is the location of the center of maps of the nodes 224–226 of element 223.

Figure 7A:
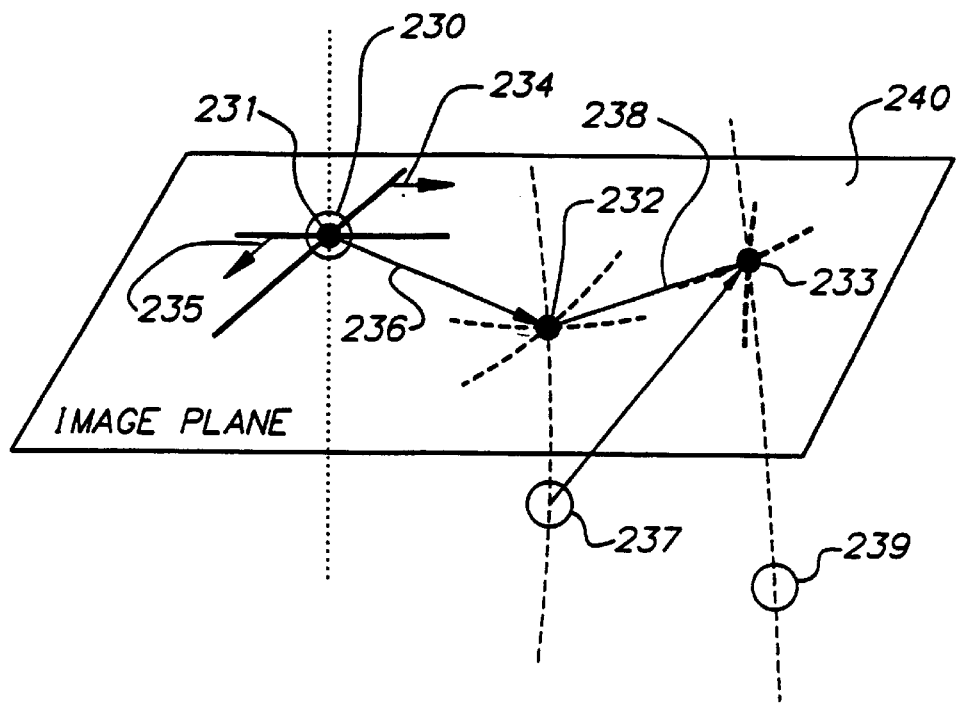
FIGS. 7a illustrates a technique for tracking sensed data points and related forces over time as they relate to the material points in an object.
Figure 7B:
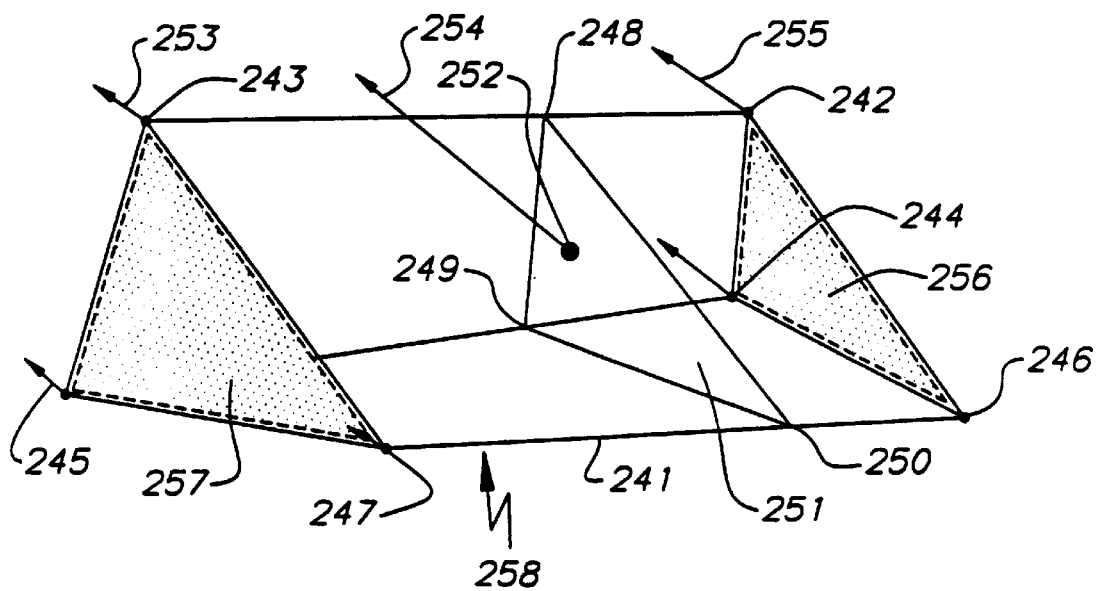
FIG. 7b illustrates the construction and forces upon a volume element during tracking.

As opposed to the boundary data, SPAMM data can provide correspondence, over time, of the associated material points, as shown in FIGS. 7a–7b. The computation of forces on the model that are parallel to their corresponding image plane can be computed as follows:

First, the SPAMM data points can be assumed to coincide with the model's material points. $M(t_1)$ 230 can be the material point which coincides initially with a SPAMM data point $S(t_1)$ 231 at time $t_1$ (see FIG. 8a). Also $S(t_2)$ 232 and $S(t_3)$ 233 can be the corresponding SPAMM data points to the point $S(t_1)$ 231 at the next two time frames. Therefore the force on $M(t_1)$ 230 from $S(t_2)$ 232 can be computed as $$f_{S(t_2)} = \gamma 2[([S(t_2) - M(t_1)] \cdot n_1) n_1 + ([S(t_2) - M(t_1)] \cdot n_2) n_2], \quad (13)$$

where $\gamma_2$ is the strength of the force and $n_1$, 234, $n_2$, 235, are the unit normals of the corresponding initial (i.e., at time $t_1$) tagging planes as shown in FIG. 2.

Second, $f_S(t_2)$, 236 will cause $M(t_1)$ 230 to move to a new position $M(t_2)$ 237. Subsequently, the force $f_S(t_3)$ 238 on $M(t_2)$ 237 from $S(t_3)$ 233 will be computed in a similar fashion as $M(t_2)$ 237 moves to $M(t_3)$ 239. The forces $f_S(t)$ are typically parallel to the corresponding image plane 240, and preferably are orthogonal to the initial tagging plane of the SPAMM data point.

Once these forces are computed, they can be distributed to the nodes of the deformable model 241, which can cause the model 241 to deform. The nodes of model 241 can be respectively labeled nodes $A_{IN}$, 242, $A_{OUT}$, 243, $B_{IN}$, 244, $B_{OUT}$, 245, $C_{IN}$, 246, $C_{OUT}$, 247. Nodal positions A, 248, B, 249, and C, 250, can define the triangular plane 251 in which sensed data point M 252 lies. At a time frame $t_i$, the computed force $f_S$ to the nodes of the prism $A_{out}B_{out}C_{out}A_{in}C_{in}$, within which M lies, can be distributed.

Based on the finite element theory, the nodal positions, A, 248, B, 249, C, 250, can be computed such that $$r = \frac{A - A_{in}}{A_{out} - A_{in}} = \frac{B - B_{in}}{B_{out} - B_{in}} = \frac{C - C_{in}}{C_{out} - C_{in}}, \quad (14)$$

where r is a scalar. To compute r, the following cubic scalar equation can be solved using, for example, the Newton-Raphson method $$(M-A)\cdot((C-A)\times(B-A))=0, \quad (15)$$

where A, 248, B, 249 C, 250, are computed with respect to r from equation (12).

Third, force $f_S$, 254, can be extrapolated to the nodes 248–250 of triangular plane ABC 251, based on the same technique used for the force computation from boundary data. The scalars $m_A$, $m_B$, $m_C$, generally correspond to the triangle's nodes A 248, B 249, C 250, respectively. Then, the forces on the inner and outer nodes 256,257 respectively of the prism 258 which can lie on the LV walls are computed as follows (see FIG. 7(b)):

$$fN_{out}=rm_N f_S$$

$$f_{N_{in}}=(1-r)m_N f_S, \quad (16)$$

where N={A, B, C}.

The computation of r which determines the model's material point, and which corresponds to a SPAMM data point, is preferred to be done once at the beginning of the LV motion estimation. In the preferred embodiment of the present invention, it is the correspondence of SPAMM data points over time that allows the twisting motion of the LV to be estimated. In addition, by combining forces from two orthogonal sets of SPAMM data points, the full 3D shape and motion of the LV can be estimated.

The parameters of the LV model that are estimated during the fitting process typically reflect the shape changes during systole. The deformable model can have, for example, six parameter functions $q_s$, to model deformations, as defined in equation (4), which can be interpreted intuitively without complex post-processing. In addition, the model has three global translation $q_c$, and four global rotation parameters $q_\theta$, as in equation (5). Based upon the above technology, a skilled artisan would recognize that the object can be modeled by the selection of the number and types of parameter functions that are suitable and appropriate for the object shape and dynamic characteristics of interest.

Figure 8A:
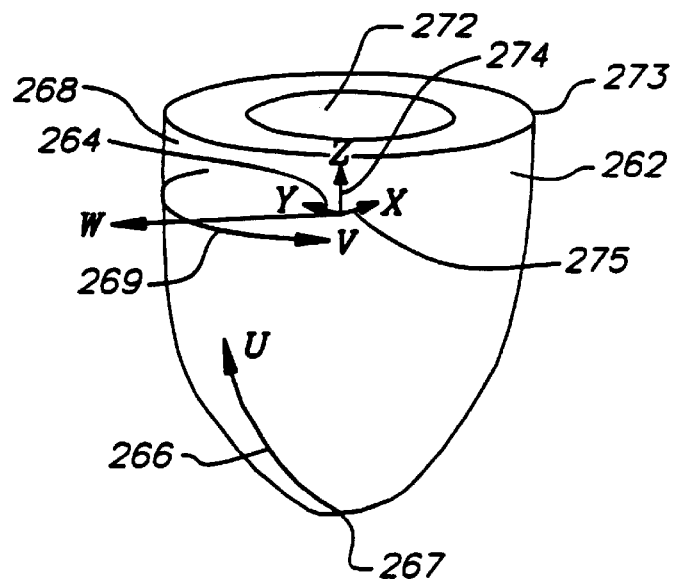
FIG. 8a is a side view of a left-ventricular heart model as used in the present invention.
Figure 8B:
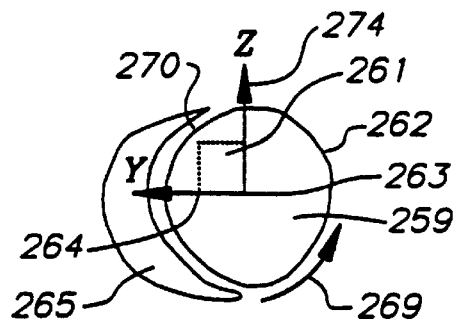
Figure 8C:
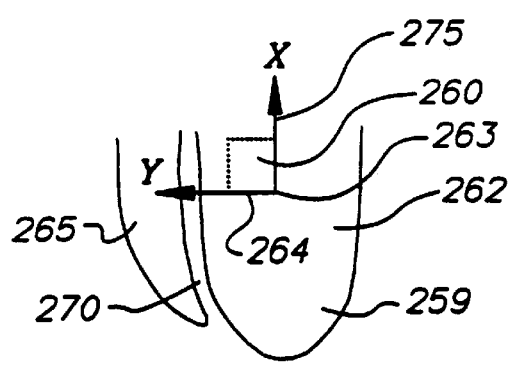

As depicted in FIGS. 8a–8c, the short- and long-axis views can initially coincide with the xy-plane 260 and yz-plane 261 in the model 262 frame of reference. The center 263 of the model 262 is preferred to be chosen at the centroid of the LV 259, with the y-axis 264 pointing towards the right ventricle (RV) 265. The material point coordinates in this case are u=(u, v, w). Coordinate reference u 266 runs from the apex 267 to the base 268 of the LV model 262, reference v 269 starts and ends where the septum 270 is located, and reference w 271 is used for the definition of model points between the inner and outer walls 272, 273 respectively, of the deformable model 262. The parameter functions that are used are preferred to be functions of u, so that the local variation throughout the LV 259 can be modeled accurately.

Table 1 summarizes the parameter functions and representation of the parameter functions during the three-dimensional shape and wall motion estimation of an LV model.

TABLE 1

| Parameter | Representation |
| --- | --- |
| $a_1$, $a_2$ | Radial contraction |
| $a_3$ | Longitudinal contraction |
| $\tau$ | Twisting about the long axis |
| $e1_0$, $e2_0$ | Long-axis deformation |

Figures 13A, 13B:
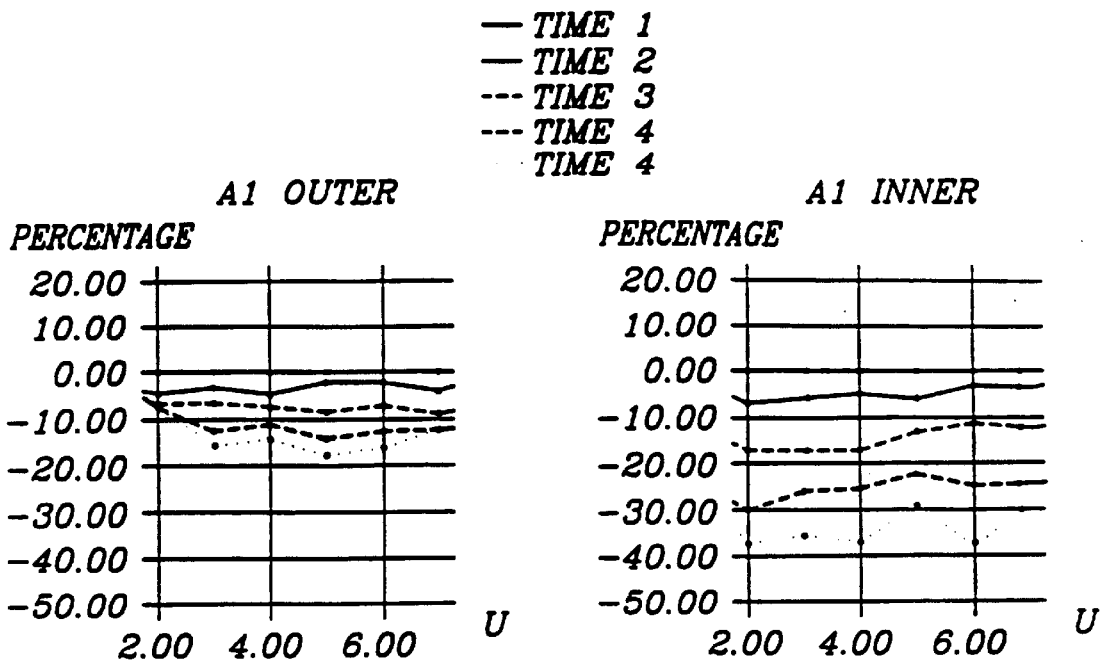

Because the short-axis views coincide initially with the xy-plane, 260, the parameter functions $a_1$, and $a_2$ can capture the radial contraction motion. Parameter functions $a_1$, $a_2$ form the aspect ratio along the LV's x- and y-axis, 275, 264, respectively. Because the y-axis 264 generally points towards the septum 270 of the heart, the $a_2$ parameter can capture the motion of the constrained wall, while the $a_1$, parameter captures the motion of the free wall. For each time frame t, the values of $a_1$(u, w) and $a_2$(u, w) can be estimated, and the percentage of the change with respect to their values at end-diastole (ED) can be computed. ED can correspond to the initial time frame (or $t_{ED}$). For example, in the graphs shown in FIG. 13(a) and in FIG. 13(b), depict the plotting of $a_1$ or the outer and inner walls, respectively, computed as follows:

Parameters $a_1$ and $a_2$, can be combined as one parameter to model the LV's radial contraction:

$$\frac{a_1(t) - a_1(t_{ED})}{a_1(t_{ED})} \times 100. \quad (17)$$

Figure 9C:
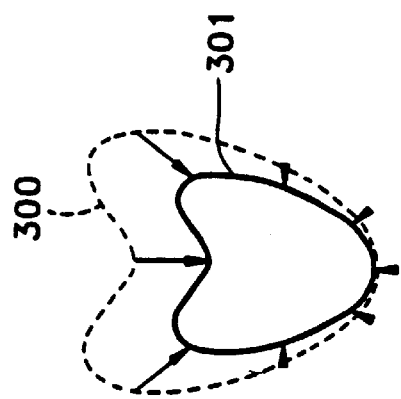
FIGS. 9a–c are illustrations of a left-ventricular model at two time intervals indicating model contraction.
Figure 9B:
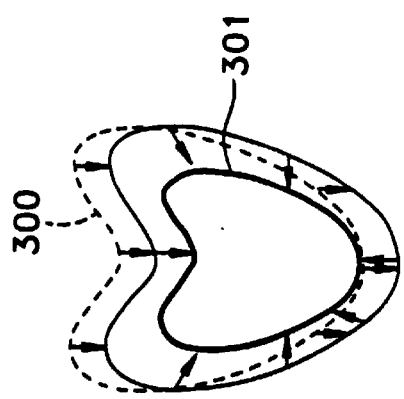
Figure 9A:
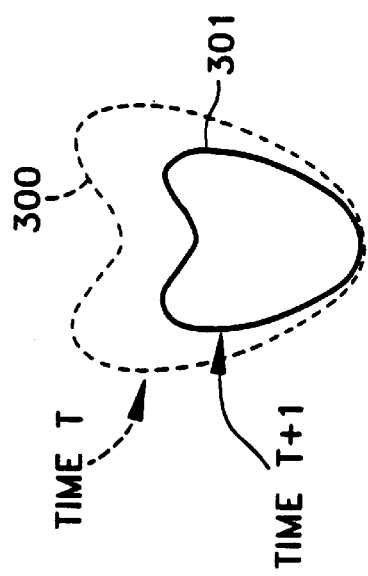

Because the long-axis views generally coincide with the yz-plane 261, the parameter function $a_3$ (which is the aspect ratio along z-axis 274) can capture the longitudinal contraction motion. However, because there may not be enough time frames collected over the heart cycle, the estimation of the global translation in the z direction 274 of the model 262 frame can be arbitrary because it can be difficult to independently estimate the two parameters, which may result in the false estimation of the longitudinal deformation parameters. The global translation in the x and the y directions 275, 274, respectively, of the model 262 frame can be negligible. In FIG. 9(a), a typical motion of an LV model observed at two subsequent time instances, T and T+1, model frames 300, 301, respectively, which shows that the motion at the apex of the LV is relatively small.

In the case where the length of the LV is 10 cm and 8 cm, at times T and T+1, respectively, the origin of the model frame 300 at time T is approximately at the half-way point along the LV, and the origin of model frame 301 would to globally translate 1 cm at time T+1. However, this amount of translation can be arbitrary because it typically depends upon the location the origin. Moreover, in this case, a relatively uniform longitudinal contraction from apex to base can be captured, as shown in FIG. 9(b). This has the result that, even though the combination of translation and longitudinal contraction would give the correct 3D motion of the LV, the longitudinal contraction may lose its intuitive meaning.

Where there is sparse sampling, and where a significant overall translation of the model in all data sets cannot be observed, the global translation may be kept constant during the fitting process for the subsequent time frames. Therefore the LV longitudinal motion as a deformation based on $a_3$ (see FIG. 9(c)) can be captured. The actual displacement can be based on the $a_3$ parameter as follows:

$$a_{3_d} = a_3(t)\sin(u) - a_3(t_{ED})\sin(u). \quad (18)$$

Figures 13C, 13D:
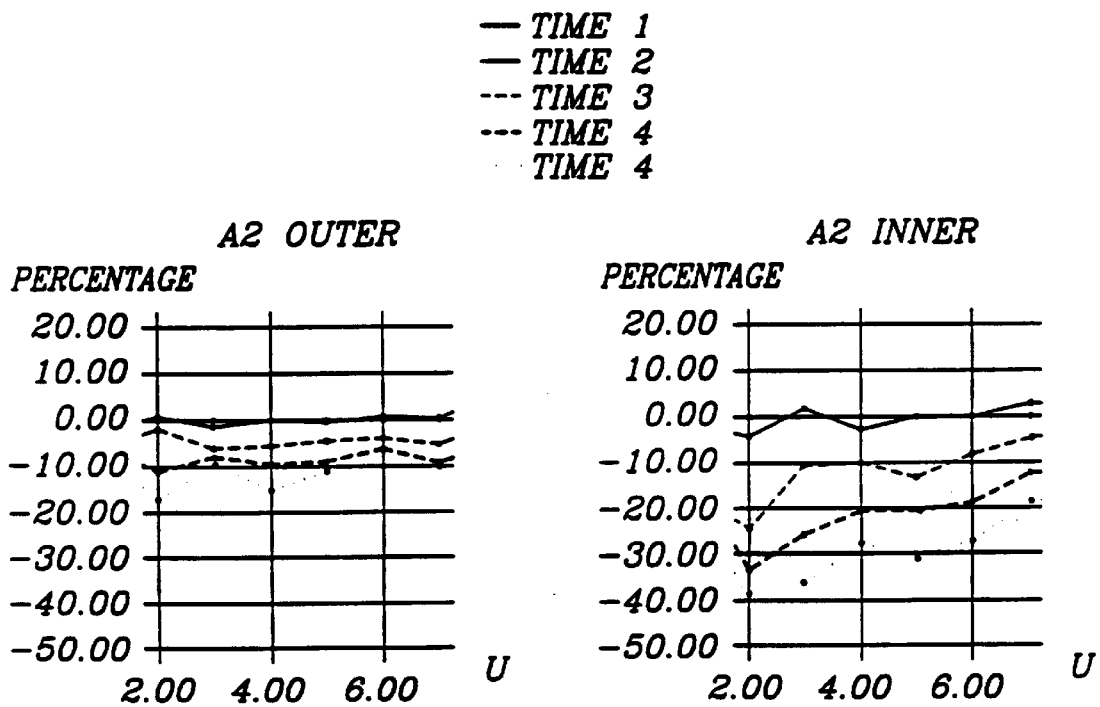

The percentage of the changes can be plotted with respect to the initial length of the LV, in order to compare the amount among different LV views. For example, the graphs shown in FIG. 13(c) indicate the plot of $a_3$, computed as follows:

$$\frac{a_{3_d}}{\text{length of the } LV} \times 100. \quad (19)$$

In the event that a pathological case exists where the LV translates (globally) significantly along the z axis in addition to contracting, then this global translation can be accommodated by simply subtracting from $a_{3_d}$ the common least amount of deformation from apex to base.

Figure 10C:
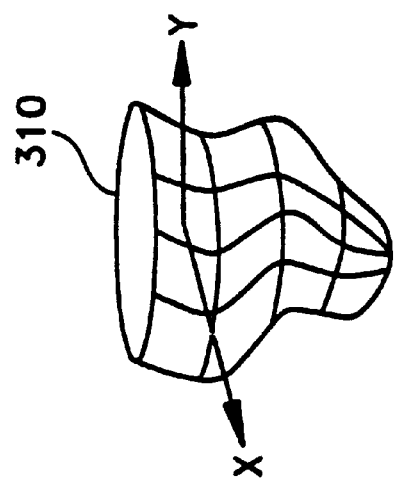
FIGS. 10a–c are illustrations of a model and two types of model deformation.
Figure 10B:
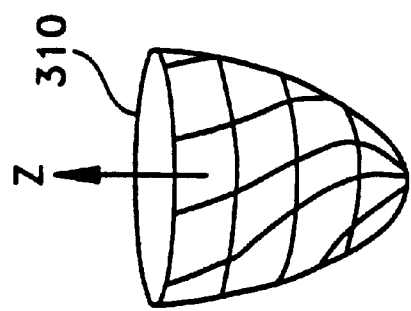
Figure 10A:
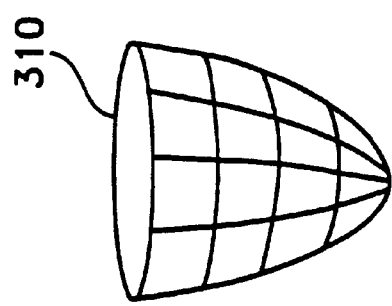

The twisting parameter function $\tau(u, v, w)$ can capture the twisting about the LV frame 310 long axis as shown in FIG. 10(b). An untwisted LV frame 310 is shown in FIG. 10(a). For each location w, and for each location u, the parameter is allowed to vary along v, in order to obtain the variation of twisting as a function of circumferential position as well. The average of the twisting values at all the circumferential positions for each location u is plotted in FIGS. 13a–13h. In this way, the twisting motion from the apex to the base of each LV can be quantified.

The models herein can have global rotation parameters expressed as a quaternion. At each subsequent time frame, the model's global rotation can be estimated before estimating the deformation parameters. In this way, the global rotation can be separated from the twisting deformation, and therefore, estimate the overall tilting of the LV.

By having the axis-offset parameters $e1_0(u,w)$ and $e2_0(u,w)$, the centroid of each cross section at a different location along the long-axis of the LV to displace globally in the xy-plane (as seen in FIG. 10(c)). In this way, the shape of the LV can be captured accurately, and at the same time the bending of the LV, if any, can be observed without using any special function for the bending.

The preferred technique for constructing these deformable models permits other global deformations such as bending and shearing to be modeled. Also, by adapting Gauss's theorem, the volume of the blood pool, and the ejection-fraction can accurately be calculated.

In order to estimate the LV's 3D motion, it is preferred to use two sets of SPAMM data obtained from mutually orthogonal image planes (e.g., short-axis and long-axis views). A sufficient number of image planes to span the spatial extent of a normal LV are desired, for example, five short-axis view planes and five long-axis view planes. Furthermore, for each image plane, data sets can be taken over a preselected number of time sequences during systole (from end-diastole to end-systole), for example, five time sequences. Therefore, in total, 10×5=50 data sets of 2D images, containing time-varying data points of the LV, can be used.

FIGS. 11a–j show a set of SPAMM data points extracted from the MR images of the LV. FIGS. 11a–e depict data points 320 at t=1 (ED), t=2, t=3, t=4, t=5 (ES), respectively, from short-axis view planes. FIGS. 11f–j depict data points 320 from t=1 to t=5, respectively, from long-axis view planes. Because some of the SPAMM data points on the image plane disappear and/or reappear at subsequent times, it is preferred that those points at every time frame which have a corresponding point at the previous time frame be tracked. Therefore, the number of active points can decrease towards end-systole. From each image, the boundary data points representing inner and outer walls also can be extracted.

For example, starting from an initial model, such as a generalized ellipsoid, the object's shape, for example the shape of the LV at the end-diastole, can be estimated from the boundary data set. Then, the motion of the object over time can be analyzed by fitting the object model to temporally-related sensed data. Again using the LV as an exemplary object, the LV model can be fitted to the data from subsequent time frames, gradually up to end-systole, allowing its motion over time to be estimated and analyzed. In general, the fitting process for each time frame takes approximately 45 seconds on a Silicon Graphics R4400 Indigo workstation, by Silicon Graphics, Inc, Mountain View, Calif. A skilled artisan would realize that other computer configurations can be used to reduce the time required to fit each time frame.

Based on the boundary data points from the inner and outer walls, the shape of the LV at time 1 (i.e., end-diastole) can be recovered. This can be done by first overlaying a simple volumetric model, which can resemble, for example, a volumetric ellipsoid, onto the data. FIG. 12a depicts the initial boundary points 324 at time t=1 (ED), in model frame 325. Initially, the model frame 325 can be placed at the center of mass of the boundary data points. The forces acting on the model can cause it to translate and to rotate to find a suitable position and orientation.

Next, based on the computation of boundary forces, the nodes on the inner and outer walls of the model are pulled towards the inner and outer boundary data points, respectively. As a result of these forces, the model parameter functions can change so that the model conforms to the data set. When all applied forces equilibrate or vanish, or the error of fit falls within an acceptable tolerance specified by the user, the model essentially comes to rest. As used herein, the error-of-fit is defined as the distance between a data point and the model surface. For efficient and effective model fitting, the following fitting schedule can be used:

1. The initial model has constant parameter functions; in particular, $a_1(u)=c_1$, $a_2(u)=c_2$, $a_3(u)=c_3$ and $\tau(u)=e1_0$, $(u)=e2_0$, $(u)=0$, where $0<c_1, c_2, c_3<1$, for all $u=(u, v, w)$ in the selected range. The model 325 in FIG. 12b rotates and translates to find its optimal location for the model center in the reference frame, while estimating $c_1$, $c_2$ and $c_3$. The value of the material coordinate w for the inner and outer walls also is estimated at this stage (FIG. 12(b): $w_{in}=0.896$ and $w_{out}=1.368$).

2. Once the fitting of the model in the first step is completed and w has been estimated for the inner and outer walls, the $a_1$, $a_2$ and $a_3$ parameters are allowed to vary with respect to w to the extent that the wall thickness more is accurately recovered (FIG. 12(c): $a1(w_{out})=0.360$, $a1(w_{in})=0.282$, $a2(w_{out})=0.341$, $a2(w_{in})=0.276$, $a3(w_{out})=0.807$, and $a3(w_{in})=0.924$).

3. Finally, the parameters also are allowed to vary in u. The parameter functions $a_1(u, w)$, $a_2(u, w)$ and $a_3(u, w)$ and then $e1_0(u, w)$ and $e2_0(u, w)$ (FIG. 12(d)), are estimated. It is preferred that twist parameter $\tau$ be activated when the data from next time frame (time 2) is loaded.

After the model fits the initial boundary data at end-diastole (ED), it can be used to fit data from subsequent time frames until end-systole (ES). The SPAMM data points at ED can be read in order to register the locations of SPAMM data points which coincide with material points. For each SPAMM data point, the volume element which encloses the point can be found, and r and $m_N$ can be computed as described above. The values of r and $m_N$ give the relative location of each material point marked on the model with respect to the enclosed volume element, so that the material point can be located however the volume element is deformed.

To fit the selected model to SPAMM data points over time, the SPAMM data points at time t+1, e.g., t=2 can be loaded onto the previously fitted model from (time t), e.g. t=1. When the model deforms due to the SPAMM data forces, the combination of forces represented in the data points in two orthogonal sets allow the deformation of the model in all three components to be recovered, effectively recovering the missing through-plane motion. Once the model comes to rest, the SPAMM data points at time t+2, e.g., t=3, are loaded onto the fitted model of time t+1, e.g. t=2. Typically, the process is repeated for up to end-systole. The deformation to from ED to ES is captured in the parameter functions which, when plotted over time, can characterize and quantify the motion of the LV. Boundary data points also can be used during the subsequent time fittings. In general, rigid motion can be estimated using both boundary and SPAMM data points, and then the deformation using only SPAMM data points.

Figure 14:
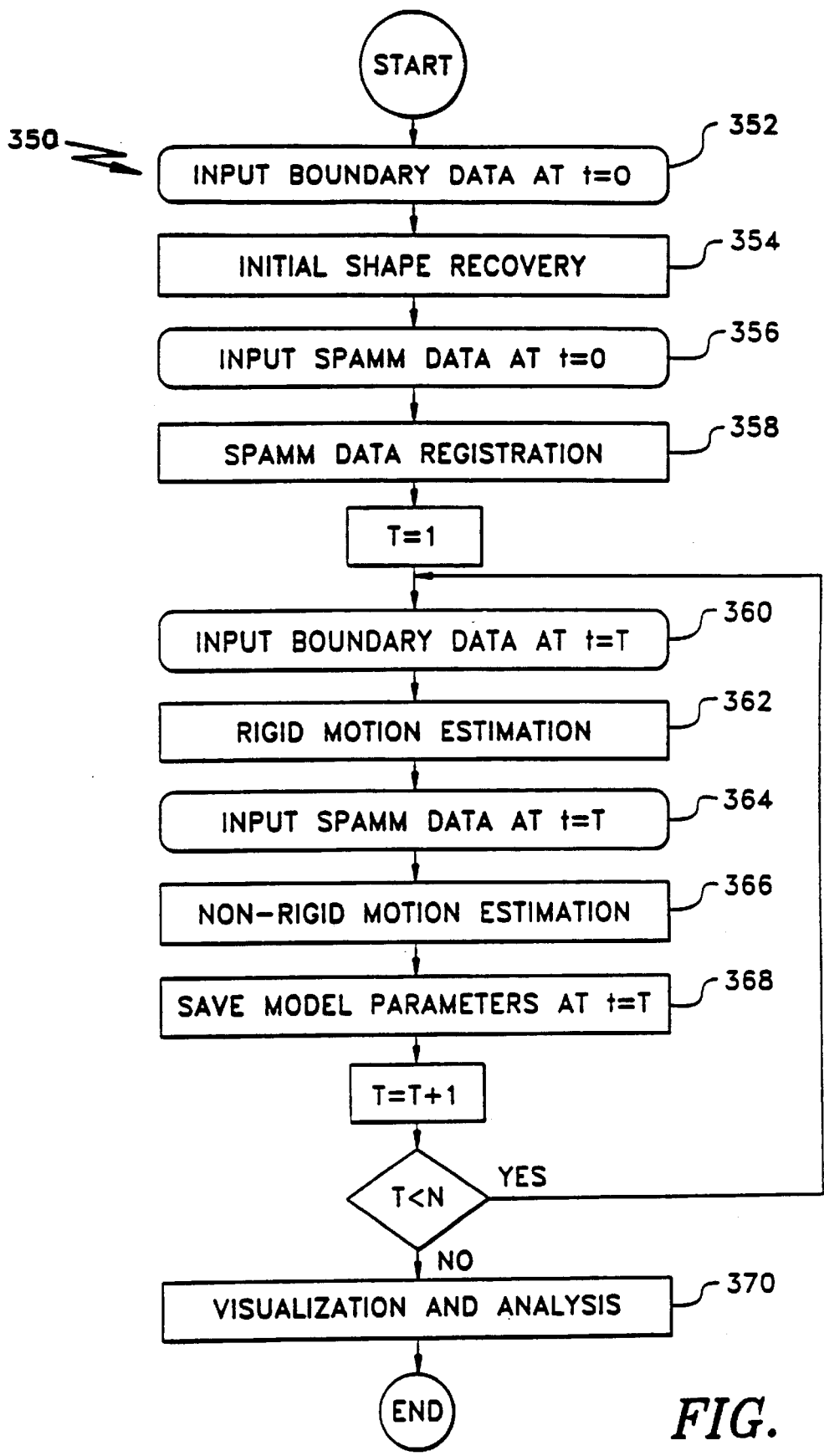
FIG. 14 is a flow diagram of one embodiment according to the present invention.

FIG. 14 depicts one presently preferred embodiment of the overall method 350 for dynamic modeling of an object having material points therein. Initially, boundary data is input at t=0, step 352, to provide the basic structure for the deformable volumetric model. At this time, the initial shape recovery parameters can be provided, step 354. With the general framework established, initial sensed (e.g., SPAMM) data points can be input at t=0, step 356, and data point registration can be effected, step 358.

The method continues by obtaining the boundary data at the particular time interval T, step 360, and performing a rigid motion estimation, step 362, therefrom. Next, sensed data is input from the sensor at time=T, step 364, and a non-rigid motion estimation is estimated, step 366, therefrom. Model parameters for t=T can be saved for use in predicting motion at t=T+1, step 368. The data thus derived can be displayed in a visually perceptible manner such that the dynamic model shape or dynamic model motion, or both, may be visualized and analyzed, step 370.

Figure 15:
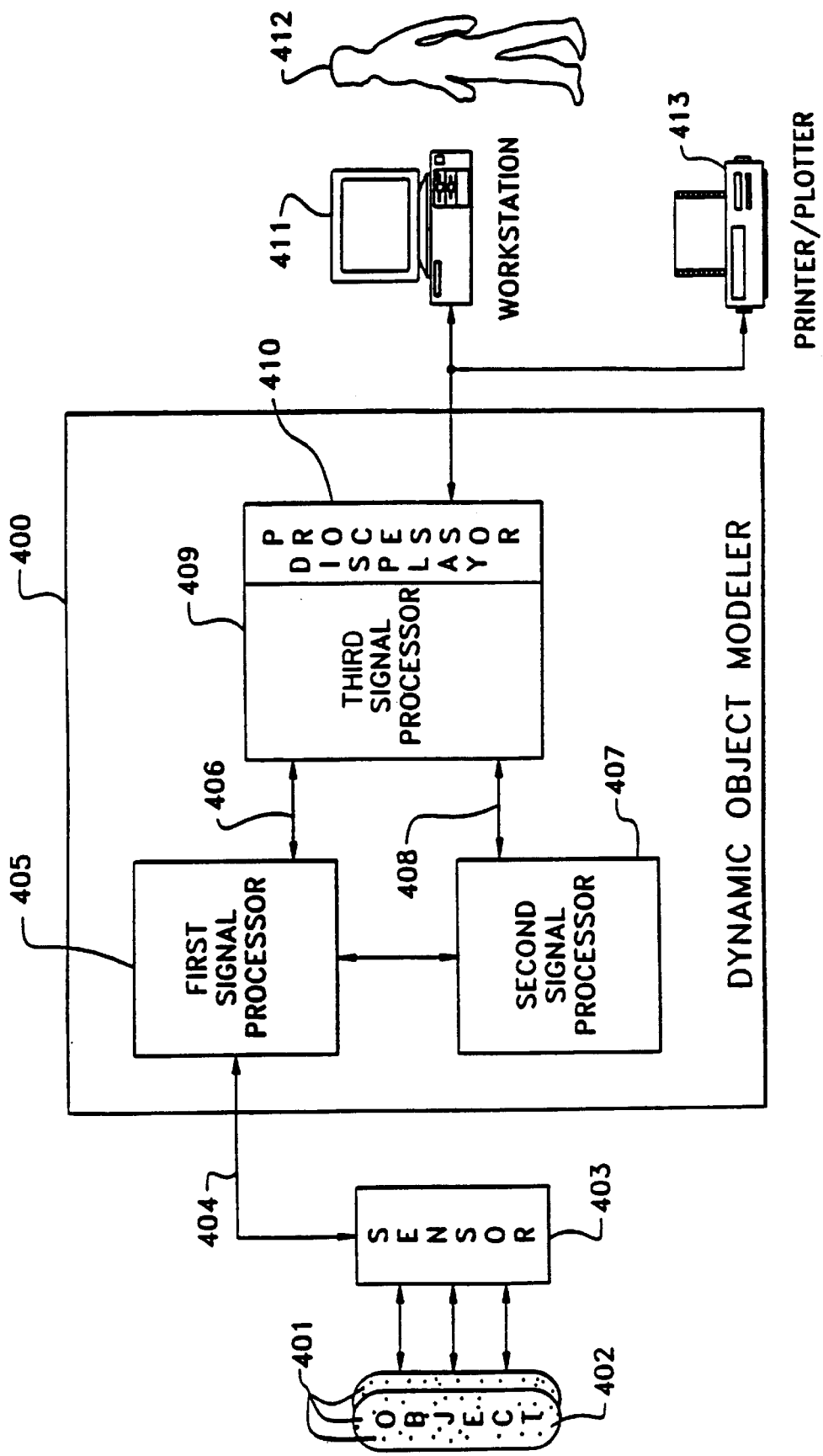
FIG. 15 is a block diagram of one embodiment of the apparatus according to the present invention.

FIG. 15 illustrates one embodiment of an apparatus for dynamic modeling of an object having material points therein. For the purposes of discussion, the apparatus is referred to as dynamic object modeler 400. In a preferred embodiment, material points 401 on the surface of and within object 402 are detected by sensor 403. Sensor 403 generates a plurality of signals 404 that correspond to respective material points 401, and thus can form a basis for tracking the dynamic characteristics of object 402. First signal processor 405 receives signals 404 from sensor 403 and generates sensed data points 406 corresponding to the material points 401. Second signal processor 407 provides a model, as represented by signal 408, representative of object 402, which is preferred to be a volumetric model of object 402, associated with multiple parameters that correspond to at least a portion of the model shape. In the preferred embodiments of the present invention, at least some of the parameters are functions.

Third signal processor 409 can receive sensed data points 406 and signal 408 which is representative of the model, and adapt the model to the sensed data points 406. Processor 409 then provides a dynamic representation of object 402 based on the adaptation of the model 408 to sensed data points 404.

The dynamic representation can be dynamic shape modeling, dynamic motion modeling, object shape estimation, object motion analysis, or a combination thereof.

Temporally-related model frames can be fitted to temporally-related data sets of sensed data 404 to produce motion analysis of object 402, and to produce a perceptible representation of object characteristics, including object defects. In preferred embodiments of modeler 400, display processor 410 can provide a visually perceptible representation of the dynamic model. This visually perceptible representation can include, for example, computer 411 with a video display that can present the adapted model to an observer 412 who can be, for example, a cardiac clinician. The video display can portray the model in an intuitive manner, employing three-dimensional motion display techniques as well as color-mapping of other parameters which may be more difficult to detect with a monochromatic display. Quantitative data regarding object 402 also may be presented on computer 411 as well as printer/plotter 413.

Sensor 403 can be a magnetic resonance imaging sensor, and the material points are spatially discernable using a three-dimensional magnetic tagging technique. Also, sensor 403 can be an ultrasonographic sensor and the material points can be spatially discernable using an ultrasound mapping technique. In addition, the sensor 403 can be a positron emission tomography sensor, an x-ray computed tomography sensor, a single-photon emission computed tomography sensor, a radar sensor, an electronic signal sensor, or an ionizing radiation sensor.

The visually-perceptible representation can be (1) a parameter graph representative of a selected parameter; (2) a three-dimensional representation of dynamic shape modeling, dynamic motion modeling, object shape estimation, object motion analysis or a combination thereof; and (3) a color-based mapping of the parameters onto the model.

Where object 402 is the heart, the parameters can be representative of radial contraction, longitudinal contraction, axial twisting, short-axis deformation, long-axis deformation, or a combination thereof. However, object 402 need not be constrained to a heart, but may be any natural, man-made, or computer-generated object. The apparatus according to the present invention can find application in other clinical setting, including analysis of the brain and abdominal structures.

To obtain data for motion modeling and motion analysis signals 404 can be at least two sets of signals, the first set of signals being in a preselected orientation relative to the second set of signals. Although the preselected orientation is presently preferred to be mutually orthogonal, other orientations also may be used, such as a concentric-coplanar orientation. Furthermore, the signal sets may be oriented at a preselected orientation angle between the sets, other than orthogonality.

All publications mentioned in this specification are indicative of the level of skill of the skilled in the art to which this invention pertains. All publications are herein incorporated by reference to the same extent as if each individual publication was specifically but individually indicated to be incorporated by reference.

While specific embodiments of practicing the invention have been described in detail, it will be appreciated by those skilled in that art that various modifications and alternatives to those details could be developed in light of the overall teachings of the disclosure. Indeed, although some of the embodiments of the invention herein are directed to the left ventricle of the human heart, a skilled artisan would realize that any three-dimensional object susceptible to having material points therein being observed by a sensor and related to sensor-generated data points, can be used, including natural, man-made, and computer-generated objects. Accordingly, the particular arrangements of the methods and apparatus disclosed are meant to be illustrative only and not limiting to the scope of the invention, which is to be given the full breadth of the following claims, and any and all embodiments thereof.

What is claimed is:

1. A method for dynamic modeling of an object having material points therein, comprising the steps of:
   a. receiving a first plurality of signals from a sensor, each signal corresponding to a respective material point, the object having a first object shape and a second object shape;
   b. providing a volumetric model representative of the object, the model having a plurality of parameters, selected ones of the plurality of parameters being functions, the plurality of parameters corresponding to at least a portion of a shape of the model; and
   c. adapting the plurality of parameters from a first model shape to a second model shape responsive to the first plurality of signals, the first model shape corresponding with the first object shape and the second model shape corresponding with the second object shape, the step of adapting producing at least one of dynamic object shape modeling, dynamic object motion modeling, object shape estimation, and object motion analysis.

2. The method of claim 1 further comprising the step of producing a visually perceptible representation of the model responsive to the step of adapting.

3. The method of claim 2 wherein the step of producing a visually perceptible representation includes providing at least one of:
   a. a parameter graph representative of a selected one of the plurality of parameters;
   b. a three-dimensional representation of at least one of dynamic shape modeling and dynamic motion modeling;
   c. a color-based mapping of the parameters onto the model.

4. The method of claim 1 wherein the step of receiving also comprises the step of receiving a second plurality of signals, the second plurality being generally in temporal correspondence with the first plurality.

5. The method of claim 4 further comprising the step of comparing the second plurality of signals relative to the first plurality of signals, and producing a perceptive representation of a defect in the object.

6. The method of claim 1 wherein the receiving step comprises receiving a first plurality of signals from a magnetic resonance imaging sensor, and further comprising the step of employing a three-dimensional magnetic tagging technique to spatially discern the material points.

7. The method of claim 6 comprising the step of dynamically modeling an object selected from a group consisting of a heart, a brain, and an abdominal structure.

8. The method of claim 7 comprising the step of dynamically modeling the left ventricle of the heart.

9. The method of claim 7 wherein the providing step comprises providing a volumetric model representative of the object, the model having a plurality of parameters representative of at least one of radial contraction, longitudinal contraction, axial twisting, and long-axis deformation.

10. The method of claim 6 comprising the step of dynamically modeling the left ventricle of a heart, and wherein the providing step comprises providing a volumetric model representative of the left ventricle, the model having a plurality of parameters representative of at least one of radial contraction, longitudinal contraction, axial twisting, short-axis deformation, and long-axis deformation.

11. The method of claim 1 wherein the step of adapting further includes the step of determining a plurality of force values representative of adapting the first object shape to the second object shape.

12. The method of claim 11 wherein the plurality of force values are representative of at least one of object rotation and object deformation.

13. The method of claim 12 wherein the step of adapting further includes the step of estimating the plurality of parameters from the plurality of force values using a Lagrangian dynamics formulation.

14. The method of claim 13 further comprising the step of discretizing the model using preselected volume elements.

15. The method of claim 13 comprising the step of discretizing the model using prismatic volume elements.

16. The method of claim 12 wherein selected ones of the plurality of parameters correspond with respective boundary data points and the step of determining a plurality of force values further includes determining a plurality of boundary data point force values representative of a shape of the object.

17. The method of claim 1 wherein the receiving step comprises receiving a first plurality of signals from an ultrasonographic sensor, and further comprising the step of employing an ultrasound mapping technique to spatially discern the material points.

18. The method of claim 1 wherein the receiving step comprises receiving a first plurality of signals from one of a positron emission tomography sensor, an x-ray computed tomography sensor, a single-photon emission computed tomography sensor, a radar sensor, an electronic signal sensor, and an ionizing radiation sensor.

19. The method of claim 1 comprising the step of dynamically modeling an object selected from a group consisting of a natural object, a man-made object, and a computer-generated object.

20. The method of claim 1 wherein the receiving step comprises receiving a plurality of signals including at least two sets of signals, the first set of signals being in a preselected orientation relative to the second set of signals.

21. The method of claim 20 wherein the preselected orientation includes an orthogonal orientation, a concentric-coplanar orientation, and an angular orientation having a predetermined angle of orientation between the first set and the second set.

22. The method of claim 1 wherein the step of adapting further comprises the step of predicting the second model shape from the first model shape.

23. The method of claim 1 wherein the step of adapting comprises the step of tracking spatial projections of selected object material points on an image plane while the object is in motion.

24. An apparatus for dynamic modeling of an object having material points therein comprising:
   a sensor;
   a first signal processor receiving a first plurality of signals from the sensor, each signal corresponding to a respective material point;
   a second signal processor providing a volumetric model representative of the object, the model having a plurality of parameters, selected ones of the plurality of parameters being functions, the plurality of parameters corresponding to at least a portion of a shape of the model; and a third signal processor connected to the first and second signal processors, the third signal processor receiving the first plurality of signals and adapting the model thereto, and providing a dynamic representation thereof.

25. The apparatus of claim 24 further comprising a display processor for producing a visually perceptible representation of the model.

26. The apparatus of claim 25 comprising a display processor for producing a visually perceptible representation selected from a group consisting of:
   a. a parameter graph representative of a selected one of the plurality of parameters;
   b. a three-dimensional representation of at least one of dynamic shape modeling and dynamic motion modeling; and
   c. a color-based mapping of the parameters onto the model.

27. The apparatus of claim 24 wherein the sensor is an ultrasonographic sensor and the material points are spatially discernable using an ultrasound mapping technique.

28. The apparatus of claim 24 wherein the sensor is a magnetic resonance imaging sensor, and the material points are spatially discernable using a three-dimensional magnetic tagging technique.

29. The apparatus of claim 28 wherein the object is the heart and the parameters are representative of at least one of radial contraction, longitudinal contraction, axial twisting, short-axis deformation, and long-axis deformation.

30. The apparatus of claim 28 for dynamic modeling of one of a natural object, a man-made object, and a computer-generated object.

31. The apparatus of claim 24 wherein the sensor is one of a positron emission tomography sensor, an x-ray computed tomography sensor, a single-photon emission computed tomography sensor, a radar sensor, and electronic signal sensor, and an ionizing radiation sensor.

32. The apparatus of claim 24 wherein the plurality of signals of the volumetric model provided by the second signal processor includes at least two sets of signals, the first set of signals being in a preselected orientation relative to the second set of signals.

* * * * *